Dec. 27, 1966  J. W. HOLZMAN  3,293,906
TESTING MACHINE

Filed Nov. 27, 1963  4 Sheets-Sheet 1

Dec. 27, 1966 J. W. HOLZMAN 3,293,906
TESTING MACHINE

Filed Nov. 27, 1963 4 Sheets-Sheet 3

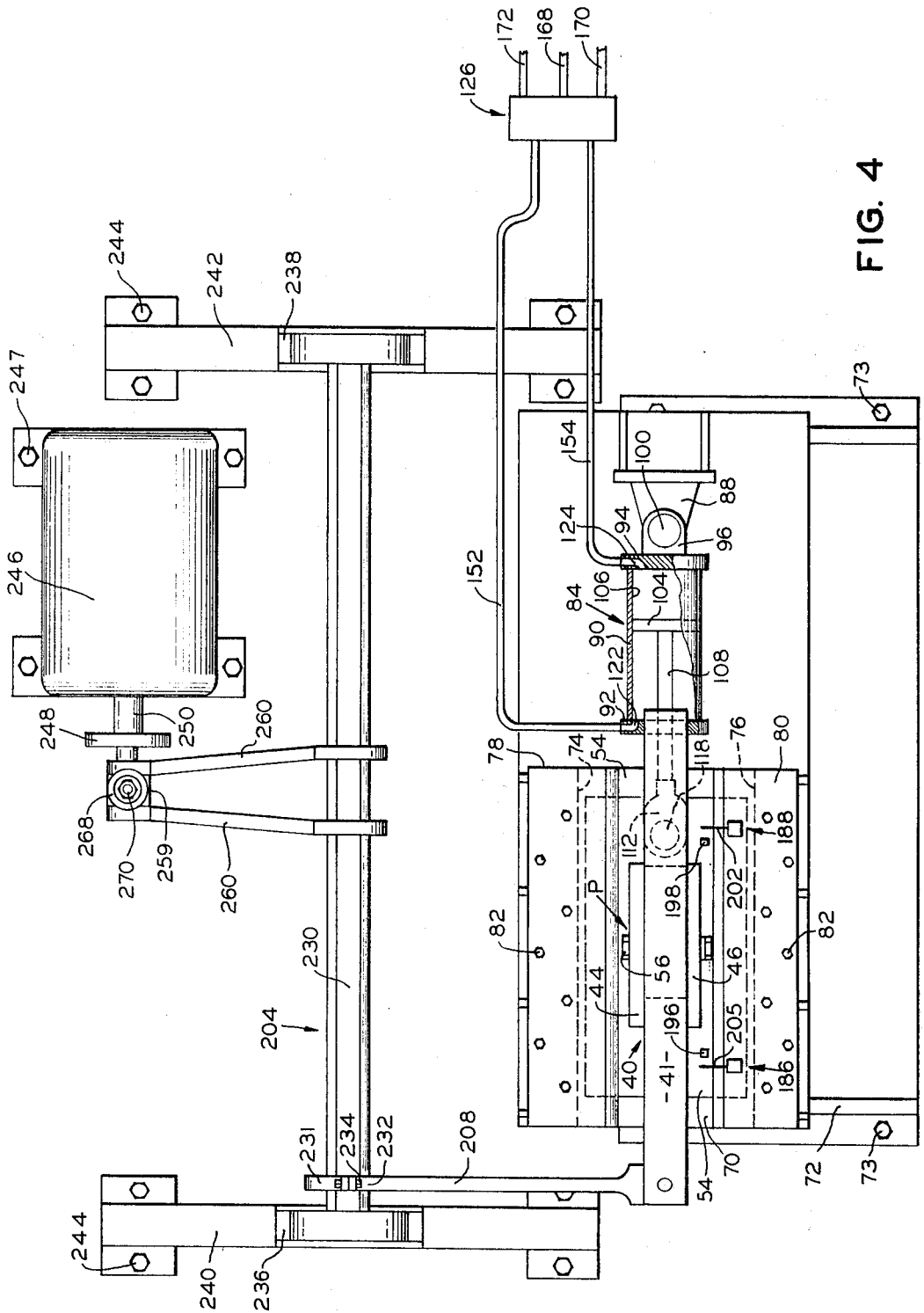

United States Patent Office 3,293,906
Patented Dec. 27, 1966

3,293,906
TESTING MACHINE
James W. Holzman, Muhlenberg Park, Pa., assignor to Dana Corporation, Toledo, Ohio, a corporation of Virginia
Filed Nov. 27, 1963, Ser. No. 326,629
14 Claims. (Cl. 73—71.6)

This invention relates to testing machines in general and more specifically to a testing machine for introducing complex loads to a vehicle and its component parts.

With the increasing modern trend toward reducing the dead weight of a vehicle while endeavoring to at least maintain but usually increase the load carrying capacity thereof, it is of utmost importance that new vehicle designs, components, and the materials from which they are manufactured be thoroughly tested before the same are accepted for commercial use. A test program of this nature if performed in mock-ups of the actual vehicle and on prolonged road testing is expensive and requires a great expenditure of time.

To this end, it is much more desirable to provide simulated tests which will subject the vehicle and/or its components to the loads which it can be expected to receive in service, while doing so under controlled laboratory conditions and at an accelerated pace. In this manner great savings of time can be realized and the thoroughness and duplicity of the test carefully controlled.

Many simulated laboratory tests have been devised for testing a vehicle and its components; however, the majority of these tests do not introduce complex loads to the vehicle which ideally simulate the actual loads which the vehicle may receive in service. For example, while a vehicle is negotiating a turn the wheels thereof may also encounter an obstruction. Accordingly, the front wheels, axle, and the body and frame components secured thereto will undergo a complex simultaneous loading; in this instance a substantially lateral load induced by the cornering loads on the vehicle in turning simultaneously with the substantially vertical jouncing load introduced from striking the obstruction. Accordingly, a laboratory test to reproduce this particular complex loading encountered in service must not only simulate vertical loads but also lateral loads and must be able to introduce these loads simultaneously.

It is, therefore, an object of this invention to provide a device for testing a vehicle and the component parts thereof which device is capable of introducing complex loads to the vehicle and its components.

It is another object of this invention to provide a device for testing a vehicle and its component parts which device is capable of simultaneously introducing a plurality of loads upon the vehicle and its components.

It is yet another object of this invention to provide a device for testing a vehicle and its component parts which is capable of simultaneously introducing loads which simulate those resulting from certain lateral forces upon the vehicle while simultaneously introducing loads which simulate those encountered when the vehicle is subjected to certain substantially vertical loads.

It is still another object of this invention to provide a device for testing a vehicle and/or its component parts which device induces loads to the frame of the vehicle at the location of the mountings for the axle thereof which loads are of a complex nature and include those simulating both lateral and vertical forces acting upon the axle of the vehicle.

Further and other objects and advantages of this invention will become apparent upon a consideration of the specification when taken in view of the following drawings wherein:

FIG. 4 is a plan view of the portion of the testing machine shown in FIG. 2 with certain portions of the vehicle omitted for added clarity.

In a preferred embodiment of this invention, a vehicle frame is mounted on the test machine and adapted to be subjected to complex loads. Certain vehicle components which will be mounted on the vehicle frame for service use, such as the motor, transmission, battery, gas tank, and test weights which represent the loads which will be carried by the vehicle are simulated on the frame by weights secured thereto, while a simulated cab is also secured to the frame. The springs for securing the rear axle to the frame are mounted on the frame and a dummy rear axle is suitably secured to the springs and in turn suitably vertically supported by a supporting stand.

The springs for attaching the front axle to the vehicle are also secured at their proper locations to the vehicle frame, and a dummy front axle is suitably secured to these springs. Means are provided to movingly load the front dummy axle and simulate the complex loads which would be imposed thereon in service use. To this end, means are provided which pivotally mount the dummy axle for oscillation transversely with respect to the longitudinal axis of the frame, including means for oscillating the dummy axle in this manner to induce loads to the frame simulating those which would be realized when the wheels of the vehicle encounter an obstruction which would vertically jounce the same. Simultaneously with the oscillatory movement, means are provided for moving the longitudinal axis about which the dummy axle is pivoting laterally with respect to the vehicle frame so that loads are induced upon the dummy axle which simulate those which would be realized when the vehicle is subjected to cornering loads. In this manner the vehicle frame and the components mounted thereon can be simultaneously subjected to lateral loads and vertical loads induced thereon through loading movement of the dummy axle.

Figure 3:
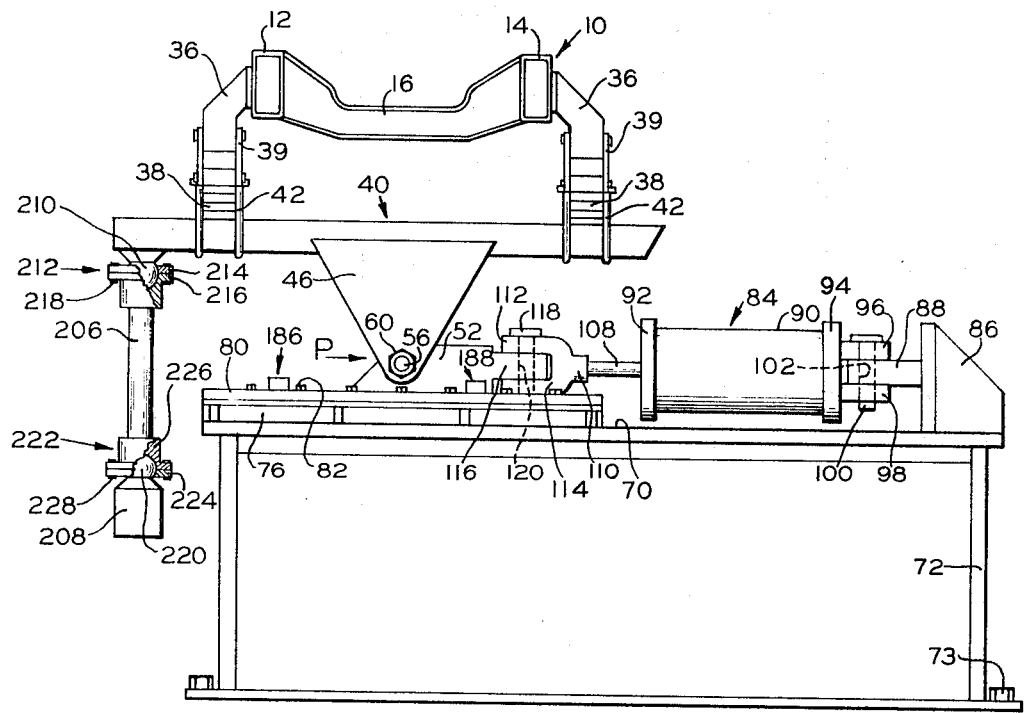
FIG. 3 is an end elevational view of the portion of the testing machine shown in FIG. 2.

Referring to the drawings, a horizontally disposed vehicle frame which is desired to be tested is shown generally at 10 and includes a pair of laterally spaced longitudinally extending side rails 12 and 14 suitably interconnected at longitudinally spaced intervals by laterally extending cross supports, one of which is indicated by the numeral 16 in FIG. 3. The frame 10 has a longitudinally extending main axis disposed substantially medially with respect to the side rails 12 and 14. A plurality of weights are positioned on the frame 10 to simulate the various service loads which may be carried thereby; a first weight M simulating the motor and its accessories, a pair of laterally spaced weights G simulating the gas tanks, a simulated cab C, a weight T simulating the transmission, and a weight L disposed near the rear of the frame simulating the various loads which would be imposed upon this location as for example fifth wheel loads.

A pair of longitudinally spaced rear spring supports 18 and 20 are secured to each side rail 12 and 14, the spring supports secured to the side rail 12 being laterally aligned with the spring supports secured to the side rail 14, and a longitudinally extending multiple leaf spring 22 is suitably mounted to each pair of supports as by bolts 23. A laterally extending dummy rear axle 24 is secured to each of the springs 22 by the usual U-bolts 26, which axle is vertically supported relative to a rigid supporting surface 28 such as the floor or the like, by a supporting platform 30 secured to the floor by a plurality of bolts 32. The axle 24 preferably is not secured to the platform 30 and may move relative thereto in directions other than vertically downwardly so that the axle is supported in the same manner that rear ground wheels (not shown) would support the same under normal operating conditions.

Longitudinally spaced from the rear spring supports 18 and 20, a pair of longitudinally spaced front spring supports 34 and 36 are secured to each side rail 12 and 14 adjacent the forward end thereof, the front spring supports secured to the side rail 12 being laterally aligned with and the front spring support secured to side rail 14 and a longitudinally extending multiple leaf spring 38 is suitably mounted to each pair of the supports as by bolts 39. A dummy front axle shaft 40 has a laterally extending portion 41 which cooperates with the spring supports 34 and 36 is secured to each of the springs 38 by U-bolts 42, and is sufficiently long to extend laterally beyond each of the springs. It is understood that the front and rear springs 38 and 22 have been shown as multiple leaf springs for illustrative purposes only, and that other well known springs may be utilized if desired, the frame 10 and axles 24 and 40 being suitably adapted to cooperate therewith.

Means, shown generally at 43, is provided to support the front axle 40 and to induce movement thereto so that loads are imposed upon the frame 10. More particularly, the dummy axle 40 also includes a pair of laterally aligned triangularly shaped pivoting members 44 and 46 which are disposed on opposed longitudinal sides of the laterally extending portion 41 of the axle 40 at a position intermediate the springs 38. The base of the triangular members 44 and 46 are suitably secured, as by welding, to the laterally extending portion 41 of the axle and an apex thereof depends vertically below the same. The members 44 and 46 are provided with longitudinally extending and aligned openings 48 and 50 respectively which openings extend through the members at a position adjacent the apex thereof and preferably disposed in a plane lying normal to the plane of the lateral portion 41 of the axle 40 and intersecting the latter at a medial position with respect to the springs 38.

The depending portions of the pivoting members 44 and 46 are disposed on opposed longitudinal sides of a vertically projecting rib portion 52 of a laterally slidable member 54 and are pivotally secured thereto by means of a pivot pin in the form of a bolt 56 which passes through the openings 48 and 50 in the pivoting members and a longitudinally extending opening 58 in the rib portion and is suitably secured therein by a nut 60; the pivoting connection at bolt 56 defining a pivot point P. In this manner the axle 40 is adapted to pivot laterally relative to the slidable member 54, this being transversely with respect to the longitudinal axis of the frame 10, and is vertically supported by the member 54. The rib portion 52 is disposed substantially intermediate the longitudinally spaced edges 62 and 64 of the base portion 66 of the member 54 and is of a longitudinal width substantially corresponding to the space between the members 44 and 46 so that it slidingly abuts the same so as to inhibit relative movement therebetween other than the desired lateral pivoting movement.

The slidable member 54 is formed with a flat bottom surface 68 and is slidingly disposed on a horizontal flat upper surface 70 of a front axle supporting platform 72, which platform rests on the rigid supporting surface 28 and is secured thereto by a plurality of bolts 73. A pair of longitudinally spaced and laterally extending abutting shoulders 74 and 76 are carried by and project vertically above the upper surface 70 a distance slightly greater than the thickness of the member 54, which shoulders are slightly longitudinally spaced from the edges 62 and 64 of the slidable member 54 so that slight relative longitudinal or cocking movement can occur therebetween. Accordingly, the member 54 is carried for sliding movement laterally and slightly longitudinally relative to the platform 72 in a horizontal plane substantially parallel to the plane of the frame 10, while the frame and axle 40 are vertically supported by the slidable member 54 and the platform 72 which constitutes the supporting and moving means 43.

A pair of laterally extending and longitudinally spaced plates 78 and 80 are secured to the top of the abutting shoulders 74 and 76 respectively by a plurality of bolts 82 and project inwardly therefrom and overlie the slidable member 54. The longitudinal inner edges of the plates 78 and 80 are sufficiently spaced so as not to engage the rib 52 during movement of the member 54. Since the shoulders 74 and 76 project vertically slightly above the member 54, the plates 78 and 80 do not interfere with relative horizontal movement between the slidable member 54 and the platform 72 while restraining the former from moving vertically upwardly relative to the latter.

Actuating means in the form of a double acting fluid pressure motor 84 is provided to reciprocate the slidable member 54 laterally relative to the platform 72 and in so doing to laterally reciprocate the pivotal connection between the axle 40 and the supporting means 43. As viewed in FIG. 3, the supporting platform 72 extends to the right substantially beyond the lateral termination of the shoulders 76 and 78 and have suitably secured to the top surface 70 at the right end thereof a mounting bracket 86 which projects vertically upwardly therefrom. A horizontal mounting lug 88 is fixedly attached to the bracket 86 and projects laterally inwardly therefrom. The motor 84 includes a cylindrical hollow housing 90 having closed left and right end walls 92 and 94 with a pair of vertically spaced horizontal mounting lugs 96 and 98 projecting laterally to the right from the wall 94 and embracing the lug 88. A vertical pivot pin 100 is disposed in aligned openings 102 in the lugs 88, 96 and 98 and drivingly connects the same for horizontal pivotal movement relative to the platform 72.

A piston 104 is slidably disposed in the bore 106 of the housing 90 and a horizontal piston rod 108 extends laterally therefrom and projects out of the housing 90 through a central opening in the end wall 92. A yoke 110 is fixedly secured to the left end of the piston rod 108 which yoke has a pair of vertically spaced horizontal lugs 112 and 114 which embrace a horizontal lug 116 which is formed integrally with and projects laterally from the rib 52 of the slidable member 54. A vertical pivot pin 118 is disposed in aligned openings 120 in the lugs 112, 114 and 116 and drivingly connects the same for horizontal pivotal movement relative to the platform 72. The pivotal movement is provided at pins 100 and 118 to allow for any longitudinal movement of the slidable member 54 which may occur while it is being reciprocated laterally by the motor 84. Since the member 54 is abutted by the shoulders 62 or 64 after a slight amount of such relative longitudinal movement, the pivotal connections at pins 100 and 118 are operable as lateral driving connections.

Figure 1:
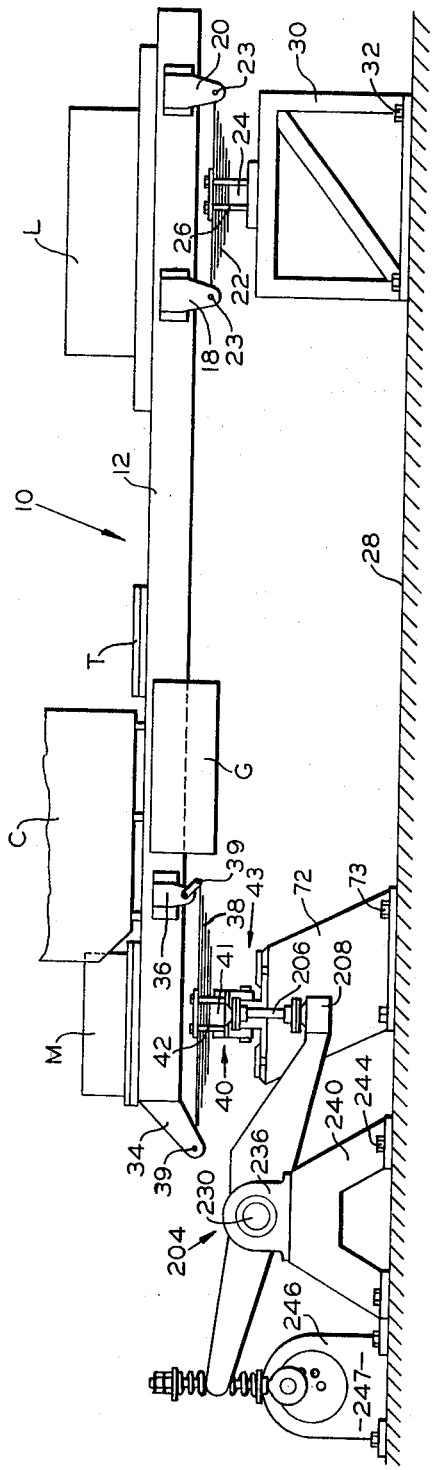
FIG. 1 is a side elevational view of the testing machine of this invention and including a vehicle frame mounted thereon; the vehicle frame being suitably loaded with portions of the vehicle and suitable weights to simulate other portions of the vehicle.
Figure 2:
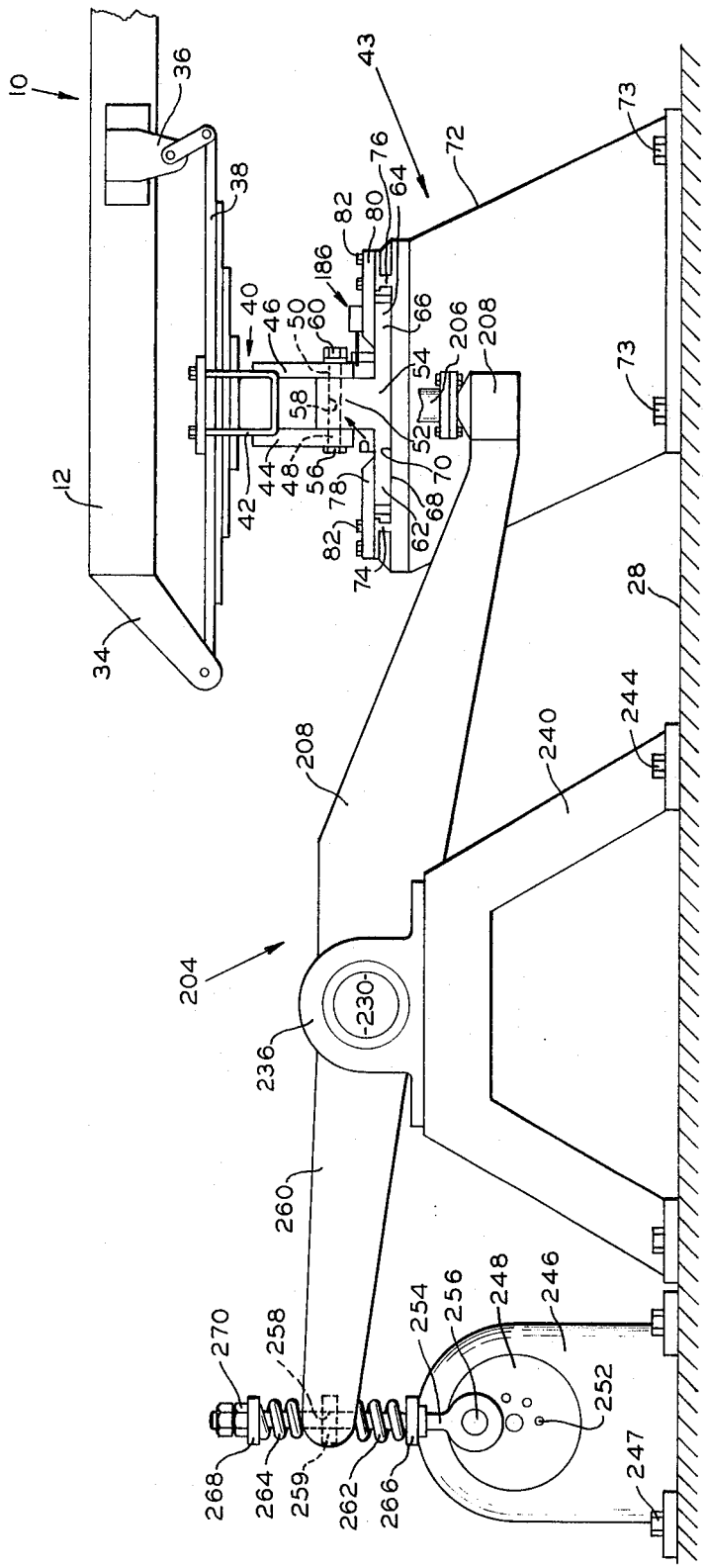
FIG. 2 is an enlarged side elevational view of a portion of the device shown in FIG. 1 with certain portions omitted for clarity purposes.
Figure 5:
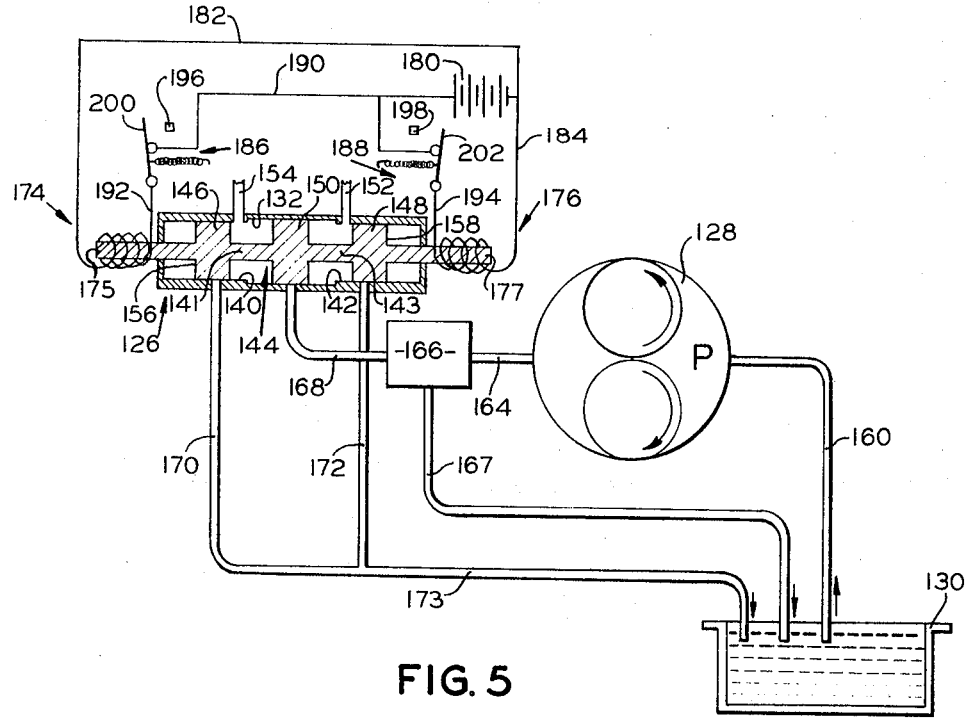
FIG. 5 is a schematic view of the means for controlling the operation of a portion of the testing machine.

The motor 84 is provided with fluid ports 122 and 124 formed in its end walls 92 and 94 respectively, which ports allow fluid to flow into and out of the bore 106 on opposite sides of the piston 104 and thus to move the latter laterally. A control valve 126 is provided to alternately connect the ports 122 and 124 to a source of pressurized fluid in the form of a pump 128 or to a sump 130. The valve 126 has a central bore 132 formed coaxially with and intermediate a pair of end bores 140 and 142, the bore 132 being slightly larger in diameter than the end bores. A valve stem 144 having end land portions 146 and 148 slidably disposed in end bores 140 and 142 respectively and a central land portion 150 of slighter greater diameter than the end land portions slidably disposed in the bore 132; the stem 144 having reduced portions 141 and 143 joining the end land portions 146 and 148 respectively with the central land portion 150. As shown in FIGS. 4 and 5, an inlet and vent line 152 connects the port 122 with the valve 126 and enters the latter at end bore 142 between the end land 148 and the central land 150, while an inlet and vent line 154 connects the port 124 with the valve 126 and enters the latter at the end bore 140 between the end land 146 and the central land 150.

A shown in FIG. 5, a slight space exists between the left and right ends 156 and 158 of the valve stem 144 and the outer ends of the bores 140 and 142 respectively. The position shown in this figure is not an operative one, but has been shown to more clearly illustrate the relationship of the various portions thereof. In operation, the stem 144 is alternately disposed to the right or left of the illustrated position.

A line 160 joins the fluid containing sump 130 with the inlet side of the pump 128 and the latter draws fluid therefrom and discharges the same into a pump output line 164 where it passes into a variable pressure regulator 166. The regulator 166 is of a well known type and may be manually controlled so as to regulate the pressure of the fluid passing through the same and into a charging line 168 leading to the valve 126. A by-pass line 167 leads from the regulator 166 to the sump 130 and operates in a well known manner. The charging line 168 from the regulator 166 to the valve 126 enters the latter at the position of the central bore 132 and with the stem 144 disposed centrally, the line 168 is blocked by the central land 150. A pair of vent lines 170 and 172 enter the valve at the left and right end bores 140 and 142 respectively, and with the valve stem 144 positioned as shown, the land 146 covers the vent line 170 and the land 148 covers the vent line 172. The lines 170 and 172 join in a common vent line 173 which returns to the sump 130.

The valve 126 also includes a pair of opposite acting solenoids 174 and 176 which are operative to move the stem 144 to its various operating positions. The core 175 of the solenoid 174 is fixedly attached to the left end 156 of the stem 144 while the core 177 is fixedly attached to the right end 158 of the stem. Accordingly, upon energization of the solenoid 174, the valve stem 144 will be moved to its fully left position wherein the land 146 moves to the left and uncovers the vent line 170 bringing the latter into a confluent relationship with the inlet and vent line 154 thereby venting the line 154 and the bore 106 to the right of the piston 104. The center land 150 assumes a position to the left between the lines 154 and the charging line 168 and blocks the flow of fluid therebetween, and in this left position, the land 150 unblocks the charging line 168 so that fluid may flow therefrom into the inlet and vent line 152 and through the latter into the bore 106 of the motor 84 to the left of the piston 104 and urges the latter to move to the right as seen in FIG. 4. The piston in moving to the right, forces the fluid on the right side thereof out of the port 124 and through the lines 154, 170 and 173 into the sump 130. The piston in turn carries the slidable member 54 to the right therewith.

Upon termination of the energization of the solenoid 174 and energization of the solenoid 176, the valve stem 144 is carried to the right until the right end 158 thereof engages the right end of the bore 142. In this position of the stem 144, the land 148 moves to the right of the vent line 172 so that inlet and vent line 152 is confluent therewith and the portion of the bore 106 to the left of the piston 104 is vented. The land 146 also moves to the right and covers the vent 170 so that it is no longer confluent with the bore 140, while the land 150 moves to the right of charging line 168 so that the latter is no longer confluent with the inlet and vent line 152 but is now confluent with the inlet and vent line 154. Fluid then passes from the line 168 and through line 154 into the bore 106 to the right of the piston 104 and forces the same to the left; the piston in moving to the left forces the fluid on the left side thereof out of the port 122 and through lines 152, 172 and 173 into the sump 130 and additionally carries the slidable member 54 to the left therewith.

It should be noted that since the center land portion 150 is larger than the land portions 146 and 148, when the valve stem 144 has been moved to the right or to the left by the solenoid 176 or 174 respectively, the stem will be held in that position by the force differential which exists from the fluid acting upon the face of the land area. Accordingly, when one of the solenoids 174 or 176 has been activated to move the valve stem in its direction, the charging fluid flowing through the valve will maintain the stem 144 in that particular position and it is not until the other solenoid is activated that the valve stem will change its position.

Means is provided to alternately energize the solenoids 174 and 176 thereby causing the piston 104 to move to its alternate lateral positions. More particularly, one end of the solenoids 174 and 176 is connected to a battery or other suitable source of power 180 by means of lines 182 and 184 respectively. A pair of limit switches 186 and 188 are also connected to the battery 180 by a common line 90 and are respectively connected to the solenoids 174 and 176 by the line 192 and 194. The switches 186 and 188 are of the spring-biased open type, and are suitably secured in laterally spaced relationship to the plate 80, which overlies the slidable member 54, and are adapted to be respectively engaged by abutting pins 196 and 198 carried by the slidable member. Accordingly, as viewed in FIGS. 4 and 5, as the slidable plate 54 is moved to the left, the abutting pin 196 will engage the switching lever 200 of the switch 186 thereby closing the latter and completing the circuit to the solenoid 174. With the solenoid 174 closed, the valve stem 144 moves to the left thereby venting the bore 106 to the right of piston 104 and charging the bore 106 to the left of piston 104 with fluid so that the piston 104 is urged to the right and carries the slidable member 54 therewith. Upon the initial movement of the movable member 54 to the right so that the pin 196 no longer closingly engages the lever 200, the switch 186 will be spring biased to an open position and no longer completes the circuit to the solenoid 174; however, as hereinbefore described, the charging fluid passing through the valve 126 between the central land 150 and the land 148 will maintain the stem 144 in its proper leftward position. Upon further movement of the member 54 to the right, the abutting pin 198 will eventually come into contact with the switch lever 202 of the switch 188 thereby closing the latter and completing the circuit to the solenoid 176.

The valve stem 144 is then urged to the right by the solenoid 176 thereby venting the line 152 and the bore 106 to the left of piston 104 and charging the line 154 and the bore 106 to the right of the piston 104 so that the latter is urged once more to the left. Upon initial movement to the left of the member 54 and pin 198, switch 188 is spring biased to its open position so that solenoid 176 is no longer energized; however, the stem 144 will be retained displaced to the right by the charging fluid until the member 54 and the pin 196 move to the left sufficiently to engage the lever 200 and close the switch 186. The position of the switches 186 and 188 and/or the abutting pins 196 and 198 are arranged so as to be laterally movable, so that the extent of lateral movement of the slidable member 54 may be controlled as desired.

Actuating means, shown generally at 204, is provided to pivot the dummy axle shaft 40 in an oscillatory manner about its pivot point P at the pivot pin 56 transversely with respect to the longitudinal axis of the frame 10. A vertically extending member in the form of a shaft 206 is pivotally and drivingly connected to the left end, as viewed in FIG. 3, of the dummy axle shaft 40 and to the rearward end of a longitudinally extending and substantially horizontal actuating arm 208. The dummy axle shaft 40 has a ball member 210 fixedly secured to the lower side thereof and depending therefrom into a two-piece socket member 212 carried by the upper end of the shaft 206; and upper portion 214 of the socket member being detachably secured to a lower portion 216 thereof for assembly purposes as by a plurality of bolts 218. Similarly, the actuating arm 208 has a ball member 220 fixedly secured to the upper side thereof, in a substantially vertically aligned relationship with the ball member 210, and projecting vertically therefrom into a second two-piece socket member 222 carried by the lower end of the shaft 206; a lower portion 224 of the socket member 222 being detachably secured to an upper portion 226 by a plurality of bolts 228 for assembly purposes. Accordingly, the shaft 206 is operable to transmit substantially vertical driving loads from the arm 208 to the dummy axle shaft 40, while, by pivoting relative to both the same, allowing for some lateral and longitudinal displacement between the arm 208 and the dummy axle shaft 40 caused by lateral movement of the pivot point at 56 and transverse oscillatory movement of the dummy axle shaft.

The actuating arm 208 extends substantially horizontally forwardly from the vertical shaft and is adapted to be rigidly mounted for unitary movement with a laterally extending driving shaft 230. The portion of the actuating arm 208 mounted on the driving shaft 230 is split into fore and aft portions 231 and 232 which are suitably secured to each other as by bolts 234 so that the relative position between the arm and shaft may be adjustably secured. The ends of the driving shaft 230 are mounted for rotation in pillow blocks 236 and 238 carried by support stands 240 and 242 respectively, which stands are secured to the rigid mounting surface 28 by a plurality of bolts 244. In this manner, oscillatory rotary movement of the shaft 230 will result in simultaneous oscillation of the actuating arm 208 and substantially vertical reciprocation of the shaft 206.

The actuating means 204 also includes a variable speed driving motor 246 secured to the rigid supporting surface 28 by bolts 247 and having drive plates 248 mounted on an output shaft 250 thereof. The drive plate 248 has a plurality of eccentric attaching openings 252, to the selective one of which a crank shaft 254 is drivingly secured by a drive pin 256. The crank shaft 254 extends substantially vertically upwardly from the pin 256 and passes through a vertical opening 258 formed in a cross-plate 259 securely carried by the forward ends of a pair of rocker arms 260, the rearward ends of which are securedly attached to the driving shaft 230 for unitary oscillatory movement.

A pair of springs 262 and 264 resiliently and drivingly connect the crank shaft 254 and the rocker arms 260, the spring 262 being disposed between a shoulder 266, carried by the shaft 254, and the bottom of the plate 259, and the spring 264 being disposed between the top of the plate 259 and a washer 268 surrounding the top of the crank shaft 254 and positioned by a pair of bolts 270 threaded on the end of the crank shaft. The springs 262 and 264 are calibrated so that a maximum desired load of variable amplitude will automatically be applied by the crank shaft 254. The eccentric attaching opening 252 is selected to obtain a crank shaft setting which, if the crank shaft 254 were rigidly secured to the rocker arms 260 would result in an excessive oscillation of the driving shaft 230, is used at the start of the test; however, by using the precalibrated springs 262 and 264 to connect the crank shaft and rocker arms, the actual load and movement induced by the rocker arms 260 is limited by the springs. In this manner, any permanent deformations or partial failures in the frame 10 will not result in the loss of the predetermined test loads, for the springs 262 and 264 will allow the crank shaft to impart a greater degree of oscillation to the rocker arms 260 to accommodate the deformation until the spring load is again attained.

It is apparent that the actuating means 204 will actuate transverse oscillatory movement of the dummy axle shaft 40 about the pivot point P at pin 56, and that the pivot point can be moved laterally simultaneously with this oscillatory movement. The phase relationship between these two loading movements can be controlled by controlling the instant at which both the motors 246 and 84 are actuated. Further, since the speed of the variable speed motor 246 may be selected in a well known manner, the test may be programed so that the phase relationship of the complex loads will vary.

In the usual test set-up, pivot pin 56 is positioned medially with respect to the dummy axle shaft 40 as above described; however, where certain field conditions are to be duplicated, as for example simulating a vehicle operating on the side of an incline, the pivot point P may be displaced from the medial position by varying the location of attachment of the springs 38 relative to the shaft 40. The actuating arm 208 and crank shaft 254 are normally adjusted so that with the dummy axle shaft 40 in a horizontal position, the vertical shaft 206 will reciprocate up and down an equal amount to oscillate the dummy axle shaft equally clockwise and counterclockwise about the pivot pin 56; however, this adjustment may vary to give unequal angular oscillation.

It should be noted that the motor 84 in moving the pivoting location of the pin 56 laterally is not inhibited in the action by the shaft 206 since the latter pivots freely with respect to the dummy axle shaft 40 and the actuating arm 208. However, in so urging the pivot point P and axle 40 laterally, it must do so against the inertial resistance of the frame 10 and the weights thereon so that the lateral loads on the pivot point and axle simulates the lateral loads that would be imposed by the axle in service.

It is therefore apparent that a device for testing a vehicle has been provided which is capable of inducing complex loads to the vehicle and its components; which device is capable of simultaneously introducing a plurality of loads on the vehicle and its components; and which device induces loads to the frame of the vehicle at the location of the mountings for an axle thereof, the loads being of a complex nature and include those simulating both lateral and vertical forces acting upon the axle of the vehicle.

While only a single embodiment of this invention has been shown and described, it is understood that many changes can be made therein and that this showing and description is for illustrative purposes only and not for the purpose of limiting this invention other than as defined in the following claims.

What is claimed is:
1. A testing machine for introducing complex loads to a device to be tested and wherein the device has a longitudinal axis comprising in combination
 (a) an element having an elongated axis and being disposed with its axis transversely to the longitudinal axis of said device,
 (b) a first and a second connecting means disposed on opposed sides of said longitudinal axis and fixed to said element,
 (c) and means for oscillating said element transversely with respect to said longitudinal axis about a pivot point intermediate said first and second connecting means and simultaneously reciprocating said pivot point laterally with respect to said longitudinal axis whereby complex loads are imposed on said device by said element.

2. A testing machine for introducing complex loads to a device to be tested comprising in combination,
(a) an element attached to said device,
(b) a relative stationary support member,
(c) pivoting means pivotally and supportingly interconnecting said element and said member whereby said element is supported by said member and pivotal relative thereto,
(d) said pivoting means being movably carried by said support member whereby the location of the pivotal connection between said element and said support member is movable,
(e) and means for oscillating said element about said pivotal connection relative to said support member and reciprocating said element relative to said device whereby said element is operative to induce complex loads to the device.

3. A testing machine for introducing complex loads to a device to be tested comprising in combination,
(a) an element attached to said device,
(b) a relative stationary support member,
(c) pivoting means pivotally and supportingly interconnecting said element and said member whereby said element is supported by said member and pivotal relative thereto,
(d) said pivoting means being movably carried by said support member whereby the location of the pivotal connection between said element and said support member is movable,
(e) first driving means connected to said element for oscillating the same relative to said support member about said pivotal connection,
(f) and driving means connected to said pivoting means and operative to move the same relative to said support member whereby said element is pivotally and movably connected to said support member and is operative to induce complex loads to said device.

4. A testing machine for introducing complex loads to a device to be tested and wherein the device has a first axis comprising in combination,
(a) an element having an elongated axis and being disposed with its axis transverse to the first axis of said device,
(b) a first and a second connecting means disposed on opposed sides of said first axis and interconnecting said element and said device,
(c) pivot means pivotally connected to said element at a position intermediate said first and second connecting means and mounting said element for oscillatory pivotal movement in a direction transverse to said first axis,
(d) a support member movingly and supportingly carrying said pivot means,
(e) and means for oscillating said element transversely with respect to said first axis and for moving said pivot means relative to said support member whereby complex loads are induced in said device.

5. A testing machine for introducing complex loads to a device to be tested and wherein the device has a first axis comprising in combination,
(a) an element having an elongated axis and being disposed with its axis transverse to the first axis of said device,
(b) a first and a second connecting means disposed on opposed sides of said first axis and interconnecting said element and said device,
(c) pivot means pivotally connected to said element at a position intermediate said first and second connecting means and mounting said element for oscillatory pivotal movement in a direction transverse to said first axis,
(d) a support member movingly and supportingly carrying said pivot means,
(e) and means for oscillating said element transversely with respect to said first axis and for reciprocating said pivot means transversely with respect to said first axis and to said support member whereby complex loads are induced in said device.

6. A testing machine for introducing complex loads to a vehicle frame, wherein the frame has a longitudinally elongated main axis and a first and a second laterally spaced and aligned axle attaching means disposed on opposed sides of said main axis comprising in combination,
(a) an elongated element disposed transversely with respect to said main axis,
(b) first and second connecting means respectively connecting said first and second axle attaching means to said element,
(c) a supporting member,
(d) a movable member supportingly carried by said supporting member,
(e) pivot means pivotally connecting said element at a point laterally intermediate said first and second connecting means to said movable member for oscillatory pivotal movement transversely with respect to said main axis,
(f) means connected to said element for oscillating the same transversely relative to said main axis,
(g) and means connected to said movable member for reciprocating the same laterally with respect to said main axis,
(h) whereby complex loads are imposed upon said device.

7. A testing machine for introducing complex loads to a horizontally disposed vehicle frame, wherein said frame has a longitudinally elongated main axis and a first and second pair of first and second laterally aligned axle attaching means disposed on opposed sides of said main axis and wherein said first and second pairs of axle attaching means are longitudinally spaced along said frame, comprising in combination,
(a) means supportingly engaging said frame at said first pair of axle attaching means,
(b) an elongated element disposed transversely with respect to said main axis and cooperable with said second pair of attaching means,
(c) first and second connecting means respectively connecting said first and second attaching means of said second pair of axle attaching means to said element,
(d) a supporting member having a substantially flat horizontally disposed upper surface positioned vertically below said element,
(e) a movable member supportingly disposed on the upper surface of said supporting member,
(f) pivot means pivotally connecting said element at a point laterally intermediate said first and second connecting means to said movable member for oscillatory pivotal movement transversely with respect to said main axis,
(g) means connected to said element for oscillating the same transversely relative to said main axis,
(h) and means for moving said movable member upon the upper surface of said supporting member,
(i) whereby complex loads are imposed upon said device.

8. A testing machine for introducing complex loads to a horizontally disposed vehicle frame, wherein said frame has a longitudinally elongated main axis and a first and second pair of first and second laterally aligned axle attaching means, and wherein said first and second axle attaching means of each pair are disposed on opposed sides of said main axis and said first and second pairs of axle attaching means are longitudinally spaced along said frame, comprising in combination,
(a) means supportingly engaging said frame at said first pair of attaching means, (b) an elongated element disposed transversely with respect to said main axis and cooperable with said second pair of attaching means, (c) first and second connecting means respectively connecting said first and second attaching means of said second pair of attaching means to said element, (d) a supporting member having a substantially flat horizontally disposed upper surface positioned vertically below said element, (e) a movable member supportingly disposed on the upper surface of said supporting member, (f) pivot means pivotally connecting said element at a point laterally intermediate said first and second connecting means to said movable member for oscillatory pivotal movement transversely with respect to said main axis, (g) means connected to said element for oscillating the same transversely relative to said main axis, (h) means carried by said supporting member and said movable member and limiting relative longitudinal and vertical movement therebetween while allowing relative lateral movement therebetween, (i) and means connected to said movable member for laterally reciprocating the same upon the upper surface of said supporting member, (j) whereby complex loads are imposed upon said device.

9. A testing machine for introducing complex loads to a horizontally disposed vehicle frame wherein said frame defines a substantially horizontal plane and has a longitudinally elongated main axis and a first and a second pair of laterally aligned first and second axle attaching means disposed on opposed sides of said main axis and wherein said first and second pairs of axle attaching means are longitudinally spaced along said frame comprising in combination, (a) rigid support means, (b) said frame being disposed vertically above said rigid support means and carrying weight means, (c) resilient means carried by said rigid support means and vertically supportingly engaging said frame at said first pair of attaching means, (d) an elongated element disposed transversely with respect to said main axis and cooperable with said second pair of attaching means, (e) first and second resilient connecting means respectively connecting said first and second attaching means of said second pair of attaching means to said element, (f) a supporting member carried by said rigid supporting means, (g) a movable member vertically supported by said support member for movement relative thereto solely within a plane lying substantially parallel to the plane defined by said frame, (h) means pivotally connecting said movable member to said element at a pivot point intermediate said first and second resilient connecting means for oscillatory pivotal movement about said pivot point transversely with respect to said main axis, (i) a vertical member connected to said element at a point laterally displaced from said pivot point, (j) first driving means for vertically reciprocating said vertical member and thereby oscillating said element, (k) a lateral member connected to said movable member, (l) and second driving means for laterally reciprocating said lateral member and said movable member and being operative simultaneously with said first driving means, (m) whereby said element is oscillated transversely about said pivot point simultaneously with lateral movement of said pivot point thereby imposing complex loads to said frame.

10. A testing machine according to claim 9 wherein said first drive means includes means for applying a predetermined maximum load of variable amplitude on said vertical member whereby the oscillatory load imposed on said frame by said element remains at a constant maximum level regardless of any deformation of said frame.

11. A testing machine for introducing complex loads to a horizontally disposed vehicle frame wherein said frame defines a substantially horizontal plane and has a longitudinally elongated main axis and a first and a second pair of laterally aligned first and second axle attaching means disposed on opposed sides of said main axis and wherein said first and second pairs of axle attaching means are longitudinally spaced along said frame, comprising in combination, (a) rigid support means, (b) said frame being disposed vertically above said rigid support means and carrying weight means, (c) resilient means secured to said first pair of attaching means, (d) first dummy axle means extending transversely with respect to said main axis and secured to said resilient means, (e) a supporting structure carried by said rigid support means and vertically supporting said first dummy axle and limiting relative movement therebetween in a vertically downward direction, (f) a second dummy axle disposed transversely with respect to said main axis and cooperable with said second pair of attaching means, (g) first and second resilient connecting means respectively connecting said first and second attaching means of said second pair of attaching means of said second dummy axle, (h) said second dummy axle including a transversely elongated portion and a portion rigidly secured thereto and depending therefrom, (i) a supporting member carried by said rigid support means and disposed in a cooperable relationship with said second dummy axle and having a substantially horizontally flat upper surface, (j) a movable member disposed on said upper surface and vertically supported by said support member, (k) means carried by one of said members for limiting the relative movement therebetween solely within a plane lying substantially parallel to the plane defined by said frame, (l) means pivotally connecting said movable member to the depending portion of said second dummy axle at a pivot point intermediate said first and second resilient connecting means for oscillatory pivotal movement in a direction solely transverse with respect to said main axis, (m) a vertical member connected to said second dummy axle at a point laterally displaced from said pivot point, (n) first driving means for vertically reciprocating said vertical member and thereby oscillating said dummy axle transversely with respect to said main axis, (o) a lateral member connected to said movable member, (p) and second driving means for laterally reciprocating said lateral member and said movable member and being operative simultaneously with said first driving means whereby said second dummy axle is oscillated transversely about said pivot point simultaneously with lateral movement of said pivot point thereby imposing complex loads to said frame.

12. A testing machine for introducing complex loads to a horizontally disposed vehicle frame wherein said frame has a longitudinally elongated main axis and a first and a second pair of laterally aligned first and second axle attaching means disposed on opposed sides of said main axis and wherein said first and second pairs of axle attaching means are longitudinally spaced along said frame comprising in combination, (a) weight means carried by said frame, (b) rigid support means disposed vertically below said frame, (c) resilient means carried by said rigid support means and vertically supportingly engaging said frame at said first pair of attaching means, (d) an elongated element disposed transversely with respect to said main axis and cooperable with said second pair of attaching means, (e) first and second connecting means respectively connecting said first and second attaching means of said second pair of attaching means to said element, (f) and means for oscillating said element about a pivot point intermediate said connecting means in a transverse direction with respect to said main axis and simultaneously moving said pivot point laterally with respect to said main axis whereby complex loads are imposed to said frame, (g) said last named means also vertically supportingly engaging said element.

13. A testing machine for introducing complex loads to a horizontally disposed vehicle frame wherein said frame defines a substantially horizontal plane and has a longitudinally elongated main axis and a first and a second pair of laterally aligned first and second axle attaching means disposed on opposed sides of said main axis and wherein said first and second pairs of axle attaching means are longitudinally spaced along said frame comprising in combination, (a) rigid support means, (b) said frame being disposed vertically about said rigid support means and carrying weight means, (c) resilient means carried by said rigid support means and vertically supportingly engaging said frame at said first pair of attaching means, (d) an elongated element disposed transversely with respect to said main axis and cooperable with said second pair of attaching means, (e) first and second resilient connecting means respectively connecting said first and second attaching means of said second pair of attaching means to said element, (f) a supporting member carried by said rigid supporting means, (g) a movable member vertically supported by said support member for movement relative thereto solely within a plane lying substantially parallel to the plane defined by said frame, (h) means pivotally connecting said movable member to said element at a pivot point intermediate said first and second resilient connecting means for oscillatory pivotal movement transversely about said pivot point with respect to said main axis, (i) a vertical member having one of its ends pivotally connected to said element at a point laterally displaced from said intermediate point and being operative when being reciprocated vertically to oscillate said element transversely with respect to said main axis, (j) a substantially horizontal member pivotally connected to the other end of said vertical member, (k) first driving means for oscillating said horizontal member thereby reciprocating said vertical member, (l) a second horizontal member connected to said movable member, (m) and second driving means for horizontally reciprocating said horizontal member thereby reciprocating said movable member for movement relative to said support member in said parallel plane and being operative simultaneously with said first driving means, (n) whereby said element is oscillated transversely about said pivot point simultaneously with horizontal movement of said pivot point thereby imposing complex loads to said frame.

4. A testing machine according to claim 13 wherein said first drive means includes means applying a predetermined maximum load of variable amplitude on said horizontal member whereby the same reciprocates said vertical member and oscillates said elongated element at a load which remains at a constant maximum level regardless of any deformation of said frame.

References Cited by the Examiner
UNITED STATES PATENTS

| | | | |
|---|---|---|---|
| 2,030,174 | 2/1936 | Kroll | 73—71.7 |
| 2,963,903 | 12/1960 | Ridgway et al. | 73—71.7 |
| 3,106,840 | 10/1963 | Bertsch | 73—71.6 |

RICHARD C. QUEISSER, *Primary Examiner.*

CHARLES A. RUEHL, *Assistant Examiner.*